(12) United States Patent
Nonaka

(10) Patent No.: US 7,446,809 B2
(45) Date of Patent: Nov. 4, 2008

(54) LENS REPLACEMENT TYPE IMAGING APPARATUS, CONTROL APPARATUS, CLEANING APPARATUS, AND CLEANING METHOD

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 623 days.

(21) Appl. No.: 10/988,244

(22) Filed: Nov. 12, 2004

(65) Prior Publication Data

US 2005/0104997 A1    May 19, 2005

(30) Foreign Application Priority Data

Nov. 17, 2003   (JP) ............................. 2003-386832
Nov. 17, 2003   (JP) ............................. 2003-386833

(51) Int. Cl.
*H04N 5/225* (2006.01)
(52) U.S. Cl. ..................................... 348/340
(58) Field of Classification Search .................. 348/340
See application file for complete search history.

(56) References Cited

U.S. PATENT DOCUMENTS

2004/0012714 A1   1/2004  Kawai

FOREIGN PATENT DOCUMENTS

| JP | 2001-298640 A | * 10/2001 |
| JP | 2002-204379 | 7/2002 |
| JP | 2002-204379 A | * 7/2002 |

* cited by examiner

*Primary Examiner*—Lin Ye
*Assistant Examiner*—Anthony J Daniels
(74) *Attorney, Agent, or Firm*—Straub and Pokotylo; John C. Pokotylo

(57) ABSTRACT

A lens replacement type imaging apparatus capable of replacing a taking lens comprises an imaging section which takes an image of a subject through the taking lens. A protective section is provided between the taking lens and the imaging section, and transmits light rays which have entered through the taking lens therethrough. A control section judges whether second cleaning processing is carried out in first cleaning processing which electrically performs cleaning processing for the protective section and the second cleaning processing which physically performs cleaning processing for the protective section. And a control section controls to inhibit the first cleaning processing when it is determined that the second cleaning processing is carried out by the control section.

16 Claims, 12 Drawing Sheets

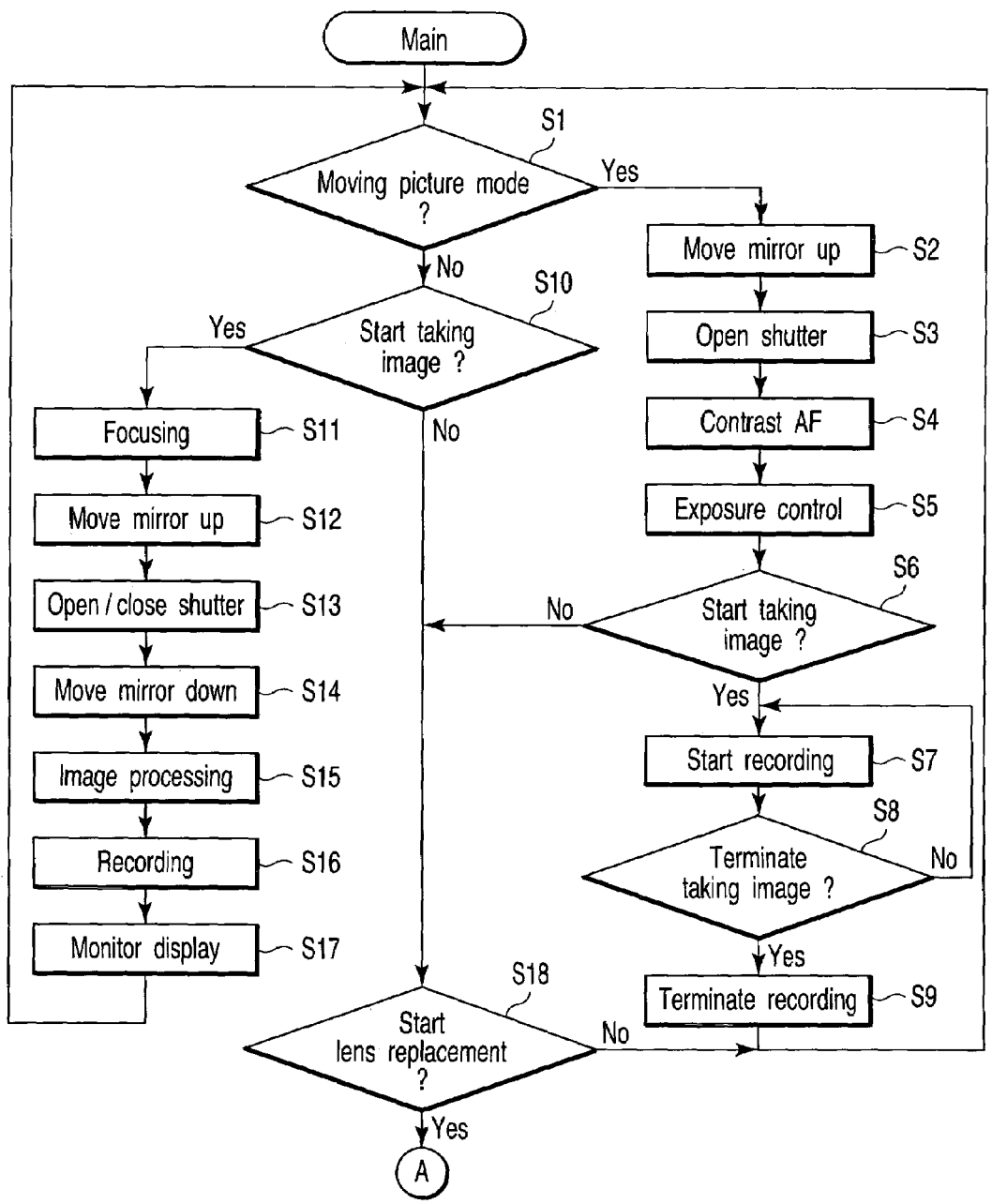
F I G. 7

LENS REPLACEMENT TYPE IMAGING APPARATUS, CONTROL APPARATUS, CLEANING APPARATUS, AND CLEANING METHOD

CROSS-REFERENCE TO RELATED APPLICATIONS

This application is based upon and claims the benefit of priority from prior Japanese Patent Applications No. 2003-386832, filed Nov. 17, 2003; and No. 2003-386833, filed Nov. 17, 2003, the entire contents of both of which are incorporated herein by reference.

BACKGROUND OF THE INVENTION

1. Field of the Invention

The present invention relates to a lens replacement type imaging apparatus capable of removing an influence of foreign particles and the like attached to an imaging element and taking an image, a control apparatus, a cleaning apparatus, and a cleaning method.

2. Description of the Related Art

In case of a lens replacement type digital camera, foreign particles, dust and other matter enter a camera main body when replacing a lens, and they are attached to a surface of an imaging element in some cases. When an image is taken in this state, foreign particles or the like come out in the acquired image, and a taken image becomes visually very undesirable. Thus, Jpn. Pat. Appln. KOKAI Publication No. 2002-204379 or the like proposes a technique by which a protective glass is provided on a front side of an imaging element and foreign particles or the like attached to a surface of the protective glass are shaken off by vibrating this protective glass by using a piezoelectric element.

Further, digital cameras now can record still pictures as well as moving pictures. Meanwhile, in the case of a digital camera using an imaging element which is superior in graphic depiction and has a high resolution, reading data of each pixel requires a long time. Furthermore, in data reading, blur of an image is generated unless appropriate light shielding is performed. Therefore, in a camera with a high resolution, a light shielding member, i.e., a so-called shutter is required on a front side of an imaging element.

BRIEF SUMMARY OF THE INVENTION

According to a first aspect of the present invention, there is provided a lens replacement type imaging apparatus capable of replacing a taking lens, comprising:

an imaging section which takes an image of a subject through the taking lens;

a protective section which is provided between the taking lens and the imaging section, and transmits light rays which have entered through the taking lens therethrough; and a control section which judges whether, out of first cleaning processing which performs cleaning processing of the protective section electrically and second cleaning processing which performs cleaning processing of the protective section physically, the second cleaning processing is carried out, and which controls to inhibit the first cleaning processing when it has judged that the second cleaning processing is carried out.

According to a second aspect of the present invention, there is provided a lens replacement type imaging apparatus capable of replacing a taking lens, comprising:

an imaging section which takes an image of a subject through the taking lens;

a display section which displays an image based on an output from the imaging section;

a protective section which is provided between the taking lens and the imaging section, and transmits light rays which have entered through the taking lens therethrough; and a control section which causes the imaging section to take a state of the protective section, and displays the state of the protective section in the display section.

According to a third aspect of the present invention, there is provided a control apparatus which controls an imaging apparatus having an imaging section which takes an image of a subject and a display section which displays an image taken by the imaging section and being capable of replacing a taking lens, comprising a control section which transmits to the imaging apparatus a signal which is used to execute imaging by the imaging section for a plurality of times in accordance with termination of attachment of the taking lens, judges whether a plurality of images obtained by the imaging operation performed for the plurality of times are even images, transmits to the imaging apparatus a signal which is used to execute a still picture imaging operation when the plurality of images are even images, and controls the imaging apparatus so that an image obtained by the still picture imaging operation is displayed in the display section.

According to a fourth aspect of the present invention, there is provided a cleaning apparatus which is detachable from and attachable to a lens replacement type imaging apparatus and performs cleaning processing for an inside of a main body of the imaging apparatus, comprising:

a detection section which detects a state in the vicinity of an imaging section provided in the main body of the imaging apparatus when the cleaning apparatus is attached to the main body of the imaging apparatus;

a judgment section which judges whether the cleaning processing is carried out based on a result of the detection section; and a control section which controls to perform cleaning processing for the vicinity of the imaging section when the judgment section determines that the cleaning processing is carried out.

According to a fifth aspect of the present invention, there is provided a cleaning method which performs cleaning processing for an inside of a main body of an imaging apparatus capable of replacing a taking lens, comprising:

removing the taking lens from the imaging apparatus;

performing imaging by using the imaging apparatus in a state that the taking lens is removed from the imaging apparatus;

judging whether the cleaning processing is carried out based on an image obtained as a result of imaging performed by the imaging apparatus; and performing the cleaning processing for the inside of the main body of the imaging apparatus when it is determined that the cleaning processing is carried out in the judging.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a flowchart showing a main control of the camera according to the first and third embodiments of the present invention;

DETAILED DESCRIPTION OF THE INVENTION

Embodiment according to the present invention will now be described hereinafter with reference to the accompanying drawings.

FIRST EMBODIMENT

Figure 1:
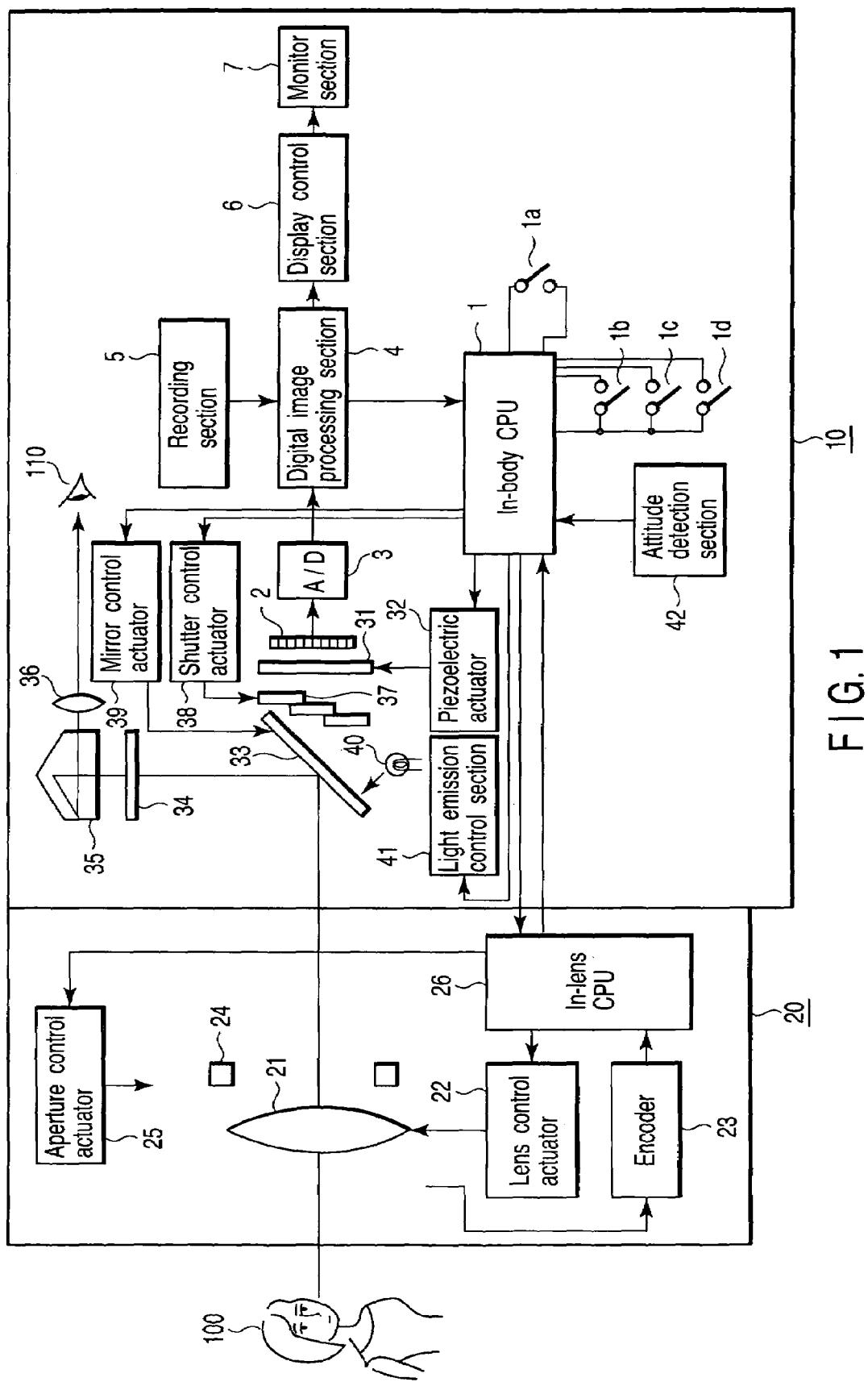
FIG. 1 is a block diagram showing a structure of a lens replacement type imaging apparatus according to first and third embodiments of the present invention.

FIG. 1 is a block diagram showing an internal structure of a camera as an example of a lens replacement type imaging apparatus according to the first embodiment. The camera in FIG. 1 is illustrated on the assumption that a lens replacement type single lens reflex camera is used, and this camera comprises a camera main body 10 and a replacement type taking lens section 20 which is detachably attached to this camera main body 10.

In the imaging lens section 20 are included a taking lens 21 which causes an image of a subject 100 to enter the camera main body 10 side, a lens control actuator 22 which controls a focusing position of this taking lens 21, an encoder 23 which detects a focusing position or a zooming position of the taking lens 21, an aperture 24 which adjusts the quantity of light which enters through the taking lens 21, an aperture control actuator 25 which drives and controls the aperture 24, and an in-lens microcomputer (an in-lens CPU) 26 which controls the lens control actuator 22, the aperture control actuator 25 or the like. As these members, conventionally known members may be used.

Moreover, in the camera main body 10 is provided a main mirror 33 which leads an image of the subject 100 which has entered through the taking lens 21 to an optical finder comprising a screen 34, a pentaprism 35 and an eyepiece lens 36. That is, the image of the subject 100 reflected by the main mirror 33 is projected onto the screen 34. A user 110 can observe the image projected on the screen 34 through the pentaprism 35 and the eyepiece lens 36.

Figure 2A:
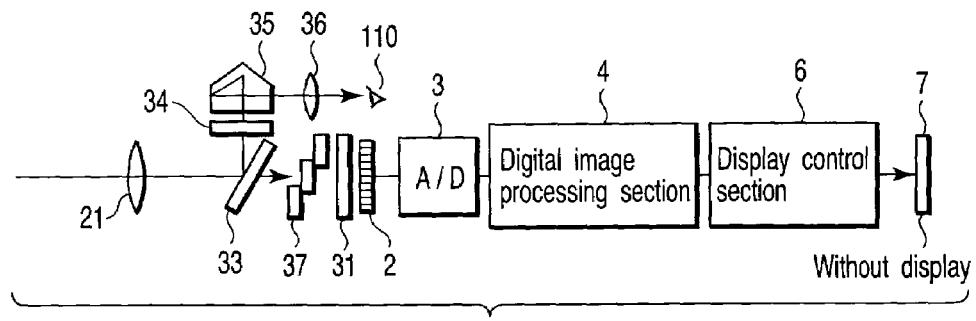
FIGS. 2A to 2D are views showing controls over a shutter and a main mirror corresponding to various states of a camera.
Figure 2B:
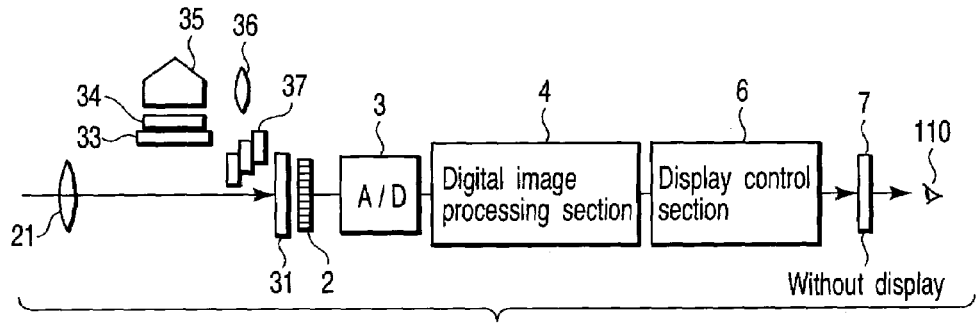

Additionally, the main mirror 33 is constituted in such a manner that it can be retired from an optical path for taking an image by a mirror control actuator 39 as shown in FIG. 2B. Further, a focal plane shutter (a light shielding member which will be referred to as a shutter hereinafter) 37 is also constituted in such a manner that it can move into/away from the optical path for taking an image. That is, the shutter 37 moves away from a light shielding position of an imaging element 2 as shown in FIG. 2B with the retiring operation of the main mirror 33. Driving of this shutter 37 is carried out by a shutter control actuator 38.

Furthermore, a protective glass (protective section) 31 which vibrates by a piezoelectric actuator (a vibration section, a cleaning processing section) 32 is provided on a front side of the imaging element (an imaging section) 2. That is, foreign particles, dust or the like attached to the protective glass 31 can be shaken off by vibrating the protective glass 31 by using the piezoelectric actuator 32.

In the imaging element 2 comprising a CCD or the like, an image of the subject 100 is converted into an electrical signal by photoelectric conversion. The electrical signal (an image signal) output from the imaging element 2 is converted into a digital signal by an analog-to-digital conversion section 3. Thereafter, in a digital image processing section 4, image processing such as color adjustment including white balance, gamma conversion, sharpness processing and others is performed with respect to the digital signal output from the analog-to-digital conversion section 3, thereby generating image data. Moreover, this image data is compressed in the digital image processing section 4, and then recorded in a recording section 5.

Additionally, the image data generated in the digital image processing section 4 can be displayed in a monitor section 7 which is a display section such as an LCD through a display control section 6.

A series of these image taking sequences or each actuator control is performed by a microcomputer (an in-body CPU) 1 which is a control apparatus (control section) in the camera main body 10. Further, the piezoelectric actuator 32, a light emission control section 41 which drives a light source 40 or the like is also controlled by the in-body CPU 1. That is, the in-body CPU 1 performs a control with a predetermined sequence based on preprogrammed software in accordance with states of a release switch (SW) 1a operated by a camera user, a lens replacement switch SW1b which is used to remove the taking lens section 20 from the camera main body 10, a selection SW (a setting section) 1c which is used to switch an operation mode of the camera to a moving picture mode or the like and others.

In this example, the in-lens CPU 26 communicates with the in-body CPU 1 in an image taking sequence. That is, the in-lens CPU 26 performs an aperture control or a lens control in accordance with an instruction from the in-body CPU 1. Furthermore, the in-body CPU 1 determines an aperture value or controls a focusing position in accordance with information transmitted from the in-lens CPU 26.

Here, in such a lens replacement type camera as shown in FIG. 1, foreign particles, dust and the like in the air readily enter the camera when replacing the lens. In a single lens reflex type camera, such a problem has already become a subject of discussion among users. Therefore, cleaning of an imaging element surface before taking an image is important, and professional photographers sufficiently take time to perform this cleaning operation.

Figure 3:
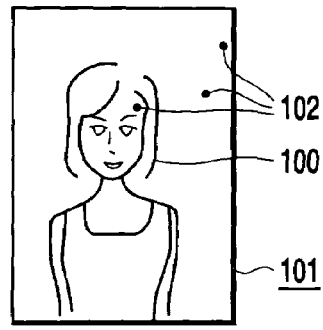
FIG. 3 is a view showing an example of a taken image in a state that foreign particles, dust and the like are attached to an imaging element.

If the cleaning operation is omitted, foreign particles and the like are attached to the imaging element surface. As a result, as shown in FIG. 3, foreign particles 102 come out in a screen 101, and a beautiful image of a subject 100 is degraded.

Figure 2C:
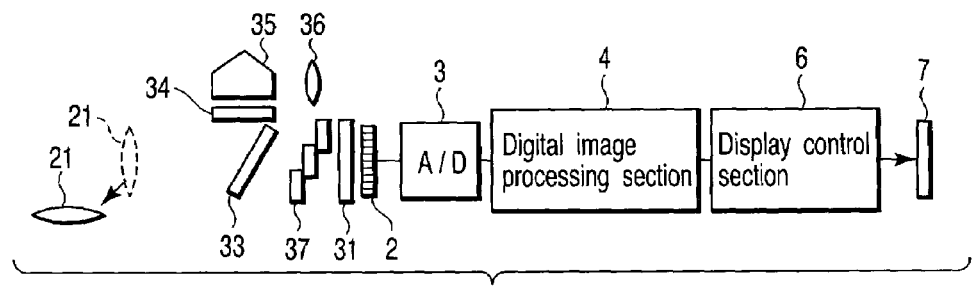

Thus, in the first embodiment, when the taking lens 21 is removed from the camera main body as shown in FIG. 2C, foreign particles and the like are prevented from being attached by covering a front surface of the imaging element 2 with the shutter 37. Further, in case of a single lens reflex type camera, a light path is controlled by the main mirror 33 as described above. Thus, in the first embodiment, when replacing the lens, as shown in FIG. 2C, foreign particles and the like are prevented from being attached to the imaging element 2 by moving the main mirror 3 to a position in front of the imaging element 2.

Figure 2D:
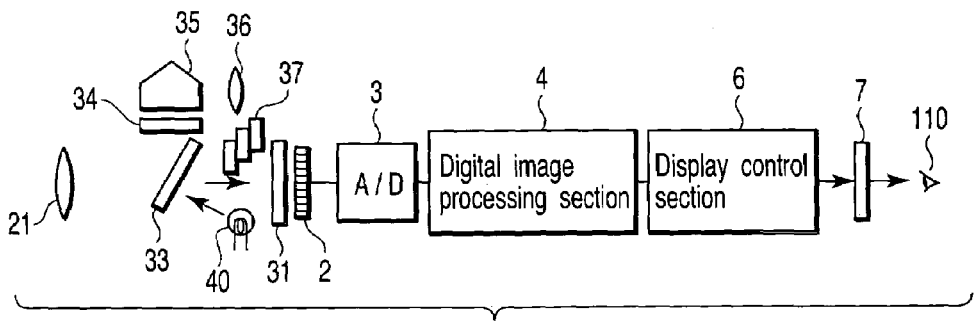

Furthermore, in the first embodiment, a user 110 can confirm whether foreign particles and the like are attached to the imaging element 2. In this case, as shown in FIG. 2D, a light source 40 is caused to emit light, and this light is reflected on a rear surface of the main mirror 33. As a result, a light for a monitor is projected onto the imaging element 2. Then, the user 110 can confirm whether foreign particles and the like are attached to the imaging element 2 from an image displayed in the monitor section 7.

With such an ingenuity, it is possible to provide the lens replacement type camera which can prevent foreign particles and the like from being attached and in which the fact that foreign particles and the like are not attached to the imaging element 2 can be confirmed before taking an image.

Here, when the camera faces down, it can be considered that foreign particles and the like in the air are hard to enter the camera main body even if the taking lens 21 is removed. It is to be noted that "face down" means a state that a subject side surface of the taking lens 21 faces down, i.e., faces in a direction of the gravitational force.

Figure 4:
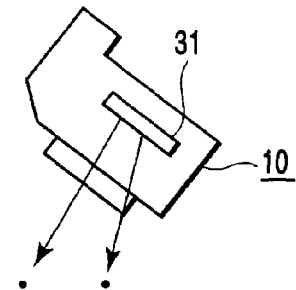
FIG. 4 is a view showing a state when a camera faces down.

In the first embodiment, as shown in FIG. 1, an attitude detection section 42 which detects the attitude of the camera is provided in the camera main body 10. As a result, when the lens is removed and the camera faces down as shown in FIG. 4, the attitude detection section 42 detects this fact, the protective glass 31 is vibrated in response to this detection so that foreign particles and the like are shaken off to the outside of the camera main body 10. Incidentally, as an attitude detection technique using the attitude detection section 42, there are known a technique which detects an attitude based on a position of a sphere which moves by the gravitational force, a technique using a mercury switch and others.

Moreover, in the first embodiment, when the user 110 operates the cleaning SW1d, the protective glass 31 is also controlled to vibrate. As a result, the user 110 can perform cleaning (first cleaning processing) of the imaging element 2 with an arbitrary timing.

Figure 5A:
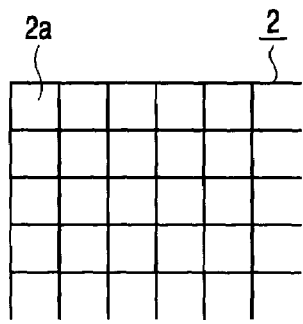
FIGS. 5A to 5C are views showing pixels of the imaging element.
Figure 6A:
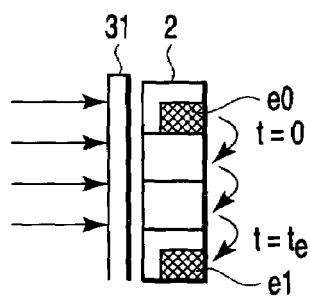
FIGS. 6A to 6B are views illustrating data reading of the imaging element.
Figure 6B:
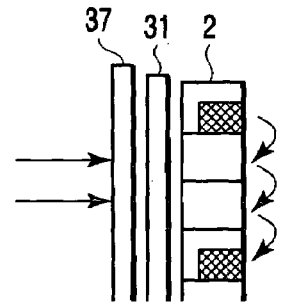

In this example, although the imaging element 2 comprises a plurality of pixels 2a as shown in FIG. 5A, some of recent cameras have 5,000,000 pixels or more. Therefore, assuming that reading data from each pixel takes a predetermined time, a time difference of $t_E$ is generated between the first pixel from which data is read and the last pixel from which data is read. Because of this time difference, as shown in FIG. 6A, when a photoelectric conversion result is transferred, electric charge which is essentially $e_0$ is changed to e1 ($e_1 > e_0$) due to incidence of light during transfer. In order to avoid this, the shutter 37 is used to prevent the light from entering the imaging element 2 when reading a photoelectric conversion result (electric charge). That is, as shown in FIG. 6B, the shutter 37 is used to shield the imaging element 2 from the light. It is to be noted that an error ($e_1 - e_0$) when reading data becomes large as the number of pixels in the imaging element 2 is increased. Conversely, when the number of pixels is small, $t_E$ becomes short, and hence the error when reading data becomes negligibly small.

Figure 5B:
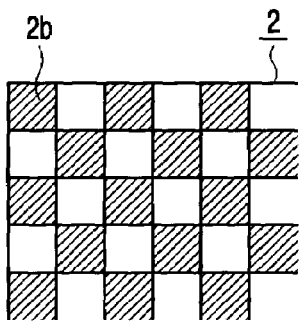
Figure 5C:
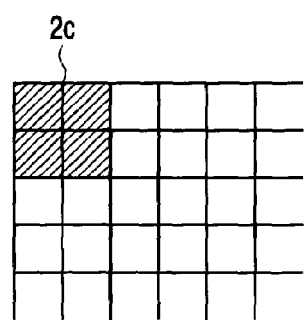

Additionally, when displaying a moving picture, if data can be read from pixels in such a manner there is no unnatural sense in eyes of the user 110, images can be sequentially fetched even if the shutter 37 is not provided, and a result can be displayed. Thus, in all pixels of the imaging element 2, it is possible to read data of the pixels 2b with hatching only as shown in FIG. 5B, or read data of pixels 2c as one pixel obtained by combining outputs from several pixels as shown in FIG. 5C. In such cases, although a resolution becomes rough to some extent, it is possible to carry out natural moving picture taking. In this manner, even in a digital camera, roughening an image reading resolution enables taking a moving picture.

On the other hand, in case of a still picture, taking a still picture with a high resolution is enabled by effectively utilizing a shutter mechanism. That is, in a still picture mode, a regular state is as shown in FIG. 2A, and it is changed to a state shown in FIG. 2B in a taking mode. Further, at the time of reading or recording an image after termination of taking, the state returns to the state shown in FIG. 2A. At this time, the monitor section 7 cannot be used. On the other hand, in a moving picture mode, the state is as shown in FIG. 2B, an optical finder such as the pentaprism 35 or the like is not used, and image taking is carried out while watching the monitor section 7 in which electronic display is performed. Here, in the first embodiment, when the lens is replaced, the shutter 37 is closed as shown in FIG. 2C in order to protect the imaging element 2 even in the moving picture mode. At this time, a fact that foreign particles and the like do not exist inside the camera can be conformed in the monitor section 7 by a control of the light source 40 or a control of the shutter 37 described with reference to FIG. 2D. Since the user 110 can confirm that foreign particles are not attached after replacing the lens and then take an image, he/she can take an image at ease.

Figure 8:
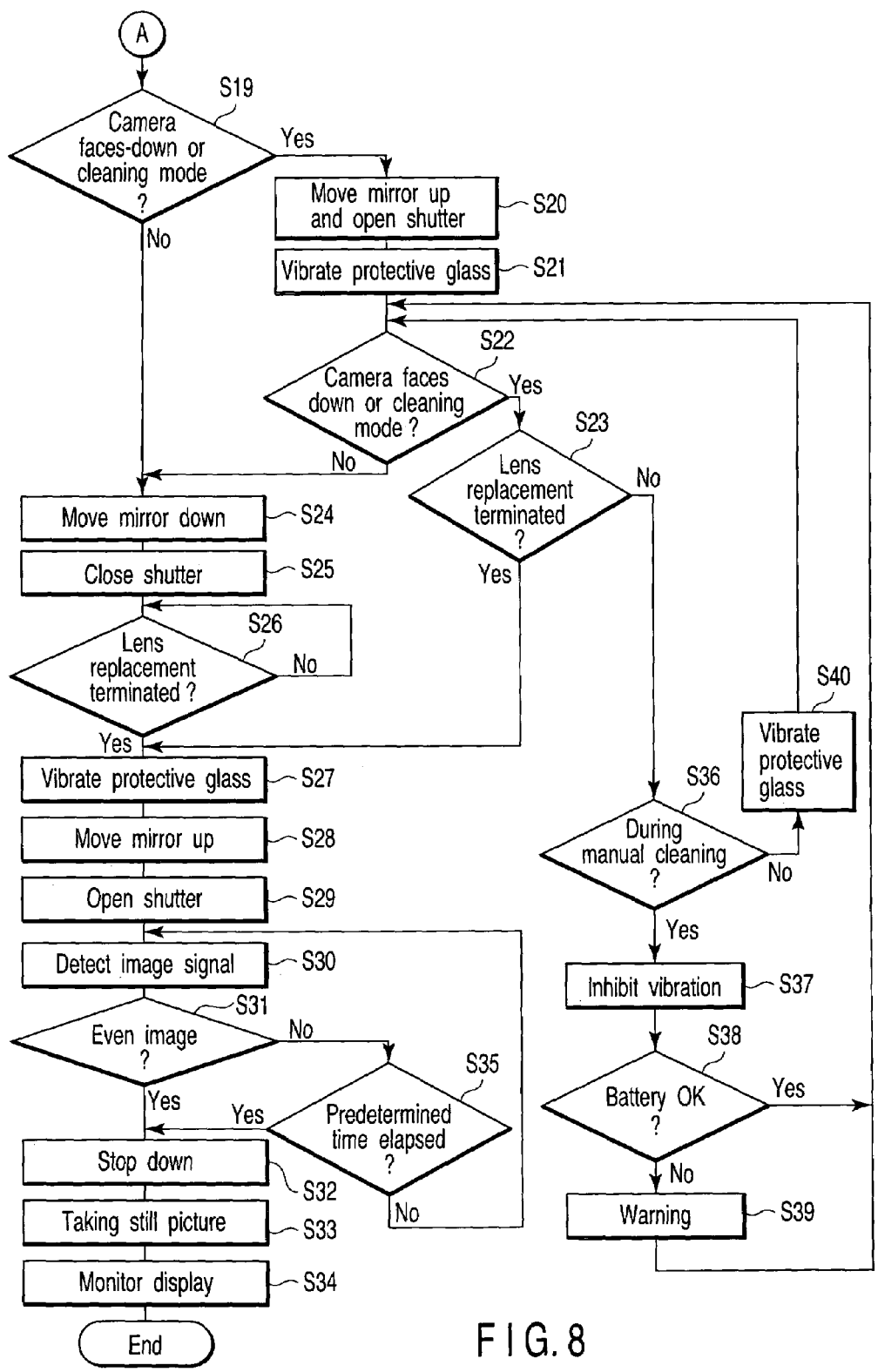
FIG. 8 is a flowchart showing a main control of the camera according to the first embodiment of the present invention.

FIGS. 7 and 8 show flowcharts of main processing of the camera according to the first embodiment. This is controlled by the in-body CPU 1 of the camera.

First, the in-body CPU 1 judges whether the image taking mode of this camera is the moving picture mode (step S1). This judgment is made in accordance with a setting of the selection SW1c which is operated by the user 110. If it is the moving picture mode, the in-body CPU 1 moves the main mirror up (step S2), opens the shutter 37 (step S3) and obtains such a state as shown in FIG. 2B in order to move the main mirror 33 or the shutter 37 away from an optical path for taking an image. Thereafter, the in-body CPU 1 moves the lens in accordance with a contrast of an image which enters the imaging element 2, and performs focusing at the peak of the contrast, which is so-called contrast AF (step S4). As a result, an in-focus image can be obtained. Then, an exposure control is carried out (step S5). This is carried out by controlling the aperture 24 in order to adjust a quantity of light which enters the imaging element 2 or controlling a read timing or the like of the imaging element 2.

Subsequently, the in-body CPU 1 judges whether an image taking start operation is performed based on a state of the release switch SW1a (step S6). If it is determined that the image taking start operation is performed, the processing diverges from step S6 to step S7, and starts recording of image data in the recording section 5 (step S7). The in-body CPU 1 judges whether an image taking end operation is carried out by the user 110 (step S8), and continues image recording of step S7 until the image taking end operation is effected. On the other hand, if it is determined that the image taking end operation is carried out, recording in the recording section 5 is terminated (step S9). Then, the processing returns to step S1.

Here, in the moving picture mode, all pixels in the imaging element 2 are not utilized because of a data read time.

Further, if it is determined that the image taking mode is a mode other than the moving picture mode in the judgment at step S1, the in-body CPU 1 judges whether the image taking start operation is carried out (step S10). If it is determined that the image taking start operation is carried out, the processing diverges from step S10 to step S11, and the in-body CPU 1 takes a still picture. In order to realize this, the in-body CPU 1 first performs focusing of the taking lens 21 (step S11). Here, it is presumed that focusing at step S11 is effected based on so-called TTL phase difference type AF. It is to be noted that the TTL phase difference type AF is a known technique, and hence FIG. 1 does not show a structure of the apparatus, and the explanation thereof is also eliminated. After focusing, the in-body CPU 1 moves the main mirror 33 up (step S12). Thereafter, it opens the shutter 37 for a predetermined exposure time (step S13). Then, it moves the main mirror 33 down (step S14). That is, the exposure control is carried out by using the opening/closing time of the focal plane shutter 37 at the step S13. As a result, all pixels are subjected to the exposure control with equal timings, thereby enabling image taking with a high image quality. Thereafter, data is read from the imaging element 2, and image processing is carried out (step S15). The processed image data is recorded in the recording section 5 (step S16). Then, the in-body CPU 1 immediately displays an image taking result in the monitor section 7 (step S17).

Even in case of a camera which can take both a still picture and a moving picture by an optimum method as described above, foreign particles, dust and others may enter the camera main body 10 at the time of replacement of the lens in some cases. if they are attached to the imaging element 2, a beautiful satisfactory picture cannot be taken. Thus, in the first embodiment, a countermeasure against dust when replacing the lens is performed by the processing at step S18 and subsequent steps.

That is, the in-body CPU 1 judges whether a lens replacement operation is started (step S18). This judgment is made based on whether the user 110 has operated a switch (lens replacement sW1b) which operates in cooperation with a lens fixing lock pin. If it is determined that the lens replacement operation is started, the processing diverges from step S18 to step S19. Then, the in-body CPU 1 judges whether the camera faces down as shown in FIG. 4 or whether a camera mode is a cleaning mode (step S19). That is, since foreign particles or dust are hard to enter when the camera faces down, the processing diverges from step S19 to step S20. Then, the in-body CPU 1 moves the main mirror 33 up and opens the shutter 37 (step S20). Thereafter, it vibrates the protective glass 31 arranged in front of the imaging element 2 by using the piezoelectric actuator 32 (step S21) so that dust are shaken off. It is good enough to intermittently carry out this vibration until the lens replacement is terminated (this judgment can be made based on a communication state between the in-body CPU 1 and the in-lens CPU 26).

Thereafter, the in-body CPU 1 again judges whether the camera faces down or whether the camera mode is the cleaning mode (step S22). If it is determined that the camera faces down as a result of this judgment, the in-body CPU 1 judges whether the lens replacement operation is terminated (step S23). If it is determined that the lens replacement operation is terminated in the judgment at step S23, the processing advances to step S27.

Moreover, if it is determined that the camera does not face down and the camera mode is not the cleaning mode in the judgment at step S19 or step S22, the in-body CPU 1 moves the main mirror 33 down (step S24), and closes the shutter 37 (step S25). Then, it judges whether the lens replacement operation is terminated (step S26), and waits until the lens replacement operation is terminated.

After the end of the lens replacement operation, the protective glass 31 is again vibrated by way of precaution (step S27) so that dust or the like attached to the protective glass 31 in front of the imaging element 2 is shaken off. Here, if the processing diverges from step S19 to step S24 and the operation at step S27 is carried out, the shutter 37 is closed. At this time, an adhesive tape or the like may be provided at a lower part of or around a gap between the shutter 37 and the protective glass 31 so that dust or the like which was shaken off can be attached to the adhesive tape. If such a structure is adopted, shaken-off dust or the like does not affect image taking.

In subsequent processing, the user 110 confirms a result of the countermeasure against dust. That is, the user 110 can confirm whether dust or the like comes out in a picture in the monitor section 7. Here, in the example shown in FIG. 2D, the light source 40 is provided so that a reference light is caused to enter the imaging element 2. In FIG. 8, however, like the moving picture mode, the control is executed to move the mirror up (step S28) and open the shutter (step S29), and the user 110 can confirm an image taking result in the monitor section 7.

However, checking each pixel in, e.g., 5,000,000 pixels is hard, and a resolution is insufficient in imaging for a moving picture. Thus, image signals are detected by repeating an imaging operation (step S30), and a judgment is made upon whether even image signals are acquired (step S31). If it is determined that even image signals are obtained in this judgment (step S31), the in-body CPU 1 commands to stop down the aperture 24 (step S32), then performs image taking in the still picture mode described from step S11 to step S16 (step S33), and displays a result in the monitor section 7 (step S34). That is, in display of an image which is used to confirm dust or the like, the user adjusts the screen in the monitor section 7 to have the even brightness so that dust can be clearly seen. Here, when displaying a confirmation image, the aperture 24 is also stopped down so that dust can be further clearly seen.

For example, when the user 110 trains the camera toward the sky after replacing the lens, the imaging element 2 is evenly illuminated.

Since processing such as pixel thinning is not carried out with respect to a display result in the still picture mode as different from the moving picture mode, dust can be correctly monitored. Here, an image displayed in the monitor section 7 may be appropriately enlarged, thereby enabling checking.

In contrast, if it is determined that the image signals acquired by the imaging element 2 are not even in the judgment at step S31, the in-body CPU 1 judges whether a predetermined time elapsed (step S35). Even if it is determined that the predetermined time elapsed in this judgment, in order to suppress power consumption, the processing advances to step S32 to take an image in the still picture mode, and an obtained result is displayed in the monitor section 7. If it is determined that the predetermined time is yet to elapse in the judgment at step S35, the processing returns to step S30.

Furthermore, if it is determined that the lens replacement operation is not terminated in the judgment at step S23, the in-body CPU 1 judges whether manual cleaning (second cleaning processing) is currently performed (step S36). This judgment technique will be described later in detail. If it is determined that manual cleaning is carried out in the judgment at step S36, the processing diverges to step S37, and vibration of the protective glass 31 is inhibited (step S37).

Moreover, since an energy for moving the mirror up or maintaining an opened state of the shutter is required during manual cleaning, the in-body CPU 1 checks a battery and judges whether the battery capacity is sufficient (step S38). If it is determined that the battery capacity is not sufficient in this judgment, a warning is given (step S39). Such a control avoids an accident that the shutter is suddenly closed during manual cleaning.

Additionally, if manual cleaning is not carried out in the judgment at step S36, vibration of the protective glass 31 is started (step S40), and the processing returns to step S22. Further, if it is determined that the battery capacity is sufficient in the judgment at step S38, the processing likewise returns to step S22.

When performing manual cleaning in this manner, since vibration of the protective glass 31 is inhibited, it is possible to avoid such an accident as that a cotton bud or the like comes into contact with the vibrating protective glass 31.

Figure 9:
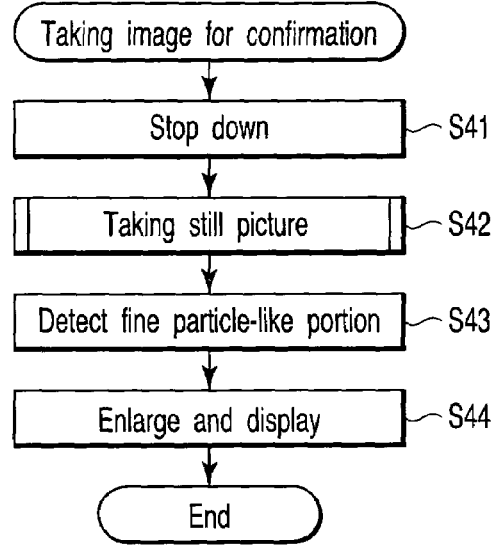
FIG. 9 is a flowchart showing another control over still picture taking for confirmation.

It is to be noted that confirmation of dust or the like after lens replacement may be carried out by the in-body CPU 1. FIG. 9 is a flowchart showing a control procedure of such confirmative still picture taking. This is a control which is performed in place of step S32 and subsequent steps in FIG. 8. That is, the in-body CPU 1 stops down the aperture 24 as described above with reference to FIG. 8 (step S41), and takes a still picture (step S42). Then, it detects a fine particle-like section (i.e., an image of a foreign particle or dust) in an image (step S43). This detection can be effected by using a technique such as a pattern judgment. Further, the detection can be carried out in the following manner.

Figure 10A:
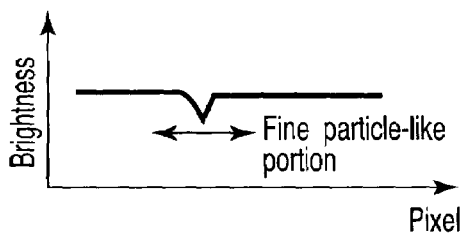
FIGS. 10A and 10B are graphs showing an image signal acquired by the imaging element.
Figure 10B:
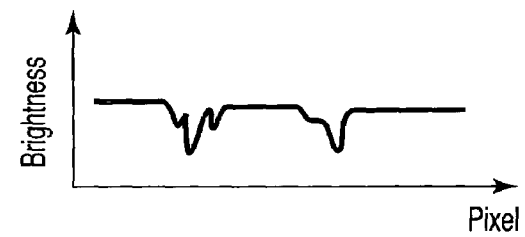
Figure 11:
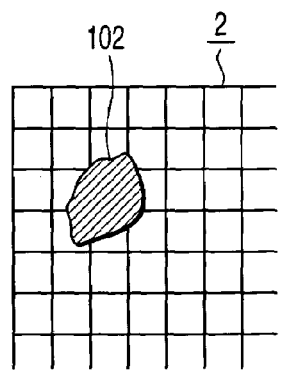
FIG. 11 is a view showing a foreign particle, dust or the like attached to the imaging element.

FIG. 10A is a graph of an image signal, in which the horizontal axis represents pixels and the vertical axis represents brightness. In a signal having the even brightness, a partially dark section is a fine particle-like section, and hence detecting this position can suffice. That is, since a foreign particle, dust or the like is attached to hide a predetermined pixel only as shown in FIG. 11, an obtained image signal is a signal that a dark section partially appears in an entirely even image signal like FIG. 10A as apparently different from an image signal of a general subject such as shown in FIG. 10B.

After detecting the fine particle-like section in this manner, the in-body CPU 1 enlarges and displays the detected fine particle-like section (step S44).

By detecting a pattern of a foreign particle, dust or the like and enlarging and displaying this section in this manner, it is possible to immediately judge whether dust or the like is attached to the imaging element 2 without taking time and giving an image a survey by the user 110. Incidentally, if a pattern of a foreign particle, dust or the like cannot be detected, this fact may be displayed in the monitor section 7.

According to this technique, presence/absence of attachment of dust or the like on the imaging surface can be rapidly judged. If it is determined that dust or the like is attached and an image of dust or the like is enlarged and displayed, it is good enough to remove the taking lens, set the camera mode to the cleaning mode with the camera facing down, and shake off dust or the like by vibration of the protective glass 31.

Figure 12:
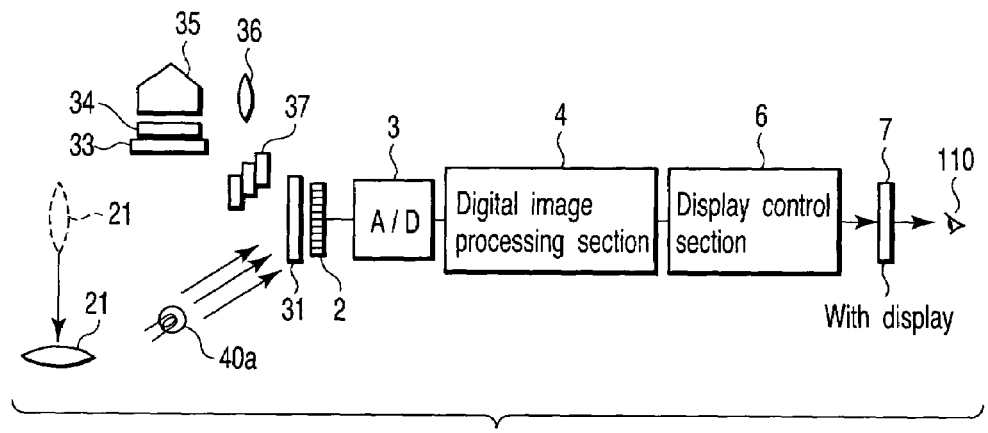
FIG. 12 is a view showing a structure which judges manual cleaning.
Figure 13:
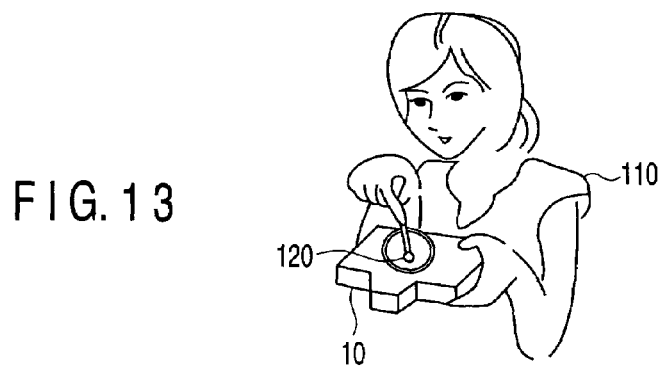
FIG. 13 is a view showing an example of manual cleaning by a user.
Figure 16:
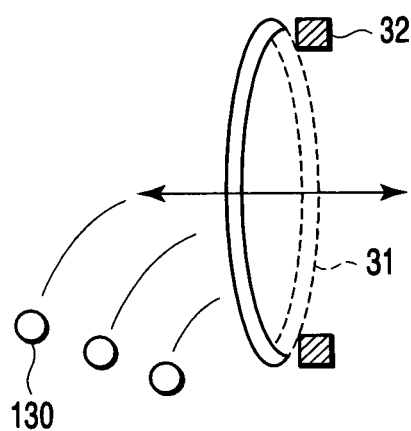
FIGS. 16A and 16B are views illustrating an accident of a protective glass.
Figure 16:
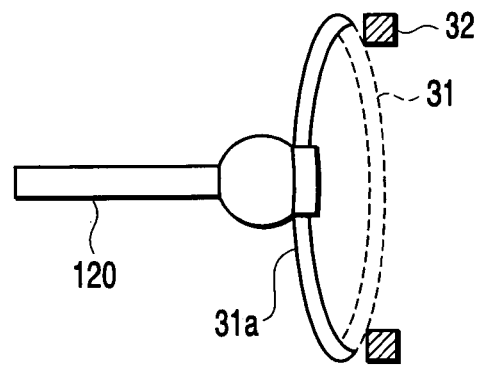

However, sticky dust or the like may enter the camera on occasion. In such a case, dust or the like cannot be shaken off by simply vibrating the protective glass 31 in some cases. Thus, as shown in FIG. 12, the user 110 removes the taking lens 21. Then, the camera is set in the cleaning mode, the main mirror 33 is moved away, the shutter 37 is opened, and the inside of the camera main body 10 is cleaned as shown in FIG. 13. At this time, the protective glass 31 is wiped by using a wiper member such as a cotton bud 120 or a pair of tweezers around which paper is wound. However, when the piezoelectric actuator 32 is operated in this state as shown in FIG. 16A, the protective glass 31 vibrates in a direction indicated by arrows. In this case, although there is an effect of shaking off dust 130, the vibrating protective glass 31 may be broken by a thrusting force of the cotton bud 120 as indicated by reference numeral 31a. Therefore, when manual cleaning is carried as shown in FIG. 13, it is preferable to stop vibration of the protective glass 31.

Figure 14A:
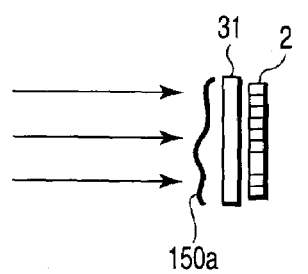
FIG. 14A is a view showing a state of an image when a foreign particle does not enter the camera.
Figure 14B:
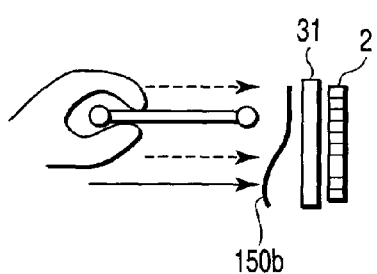
FIG. 14B is a view showing a state of an image when a foreign particle enters the camera.

In this example, therefore, as shown in FIG. 14A or 14B, a judgment is made upon whether manual cleaning is carried out by utilizing an output from the imaging element 2. That is, a judgment is made upon whether the user 110 inserts the cotton bud 120 or the like into the camera main body 10 based on whether a shape of an image 150a which enters the imaging element 2 varies. Here, FIG. 14A shows an image state in which the cotton bud 120 is not inserted in the camera main body, and FIG. 14B shows an image state in which the cotton bud 120 is inserted into the camera main body.

Figure 15:
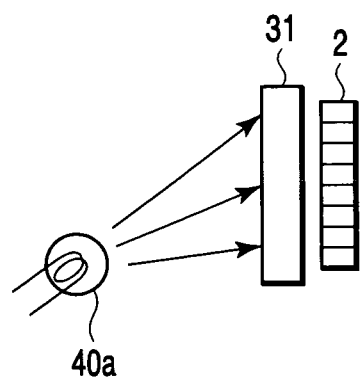
FIG. 15A is a view showing how light enters the imaging element when there is no foreign particle in the camera.
FIG. 15B is a view showing how light enters the imaging element when there is a foreign particle in the camera.
Figure 15:
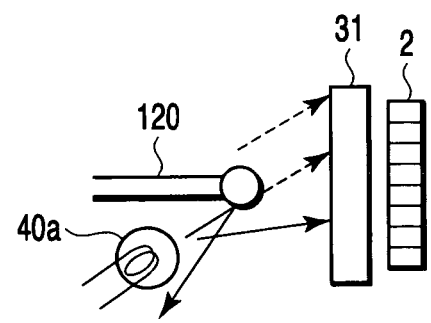

As a structure for making such a judgment, as shown in FIG. 12, a light projection section 40a is provided in the camera main body 10. This light projection section 40a is arranged so that an auxiliary light can be projected on the protective glass surface as shown in FIG. 15A. Here, as the light projection section 40a, it is possible to use the light source 40 which is used to discover dust as described in connection with FIG. 2D, or any other member.

In such a structure, a judgment is made upon whether a foreign particle such as the cotton bud 120 is inserted based on whether the light from the light projection section 40a is interrupted. If the cotton bud 120 or the like is inserted, the light which enters the imaging element 2 is interrupted by the cotton bud 120 as shown in FIG. 15B. As a result, an image 150a shown in FIG. 14A is changed to such an image 150b having no distribution as shown in FIG. 14B, and hence it is possible to determine that a foreign particle is inserted in the camera main body. At this time, stopping vibration of the protective glass 31 can suffice.

Figure 17:
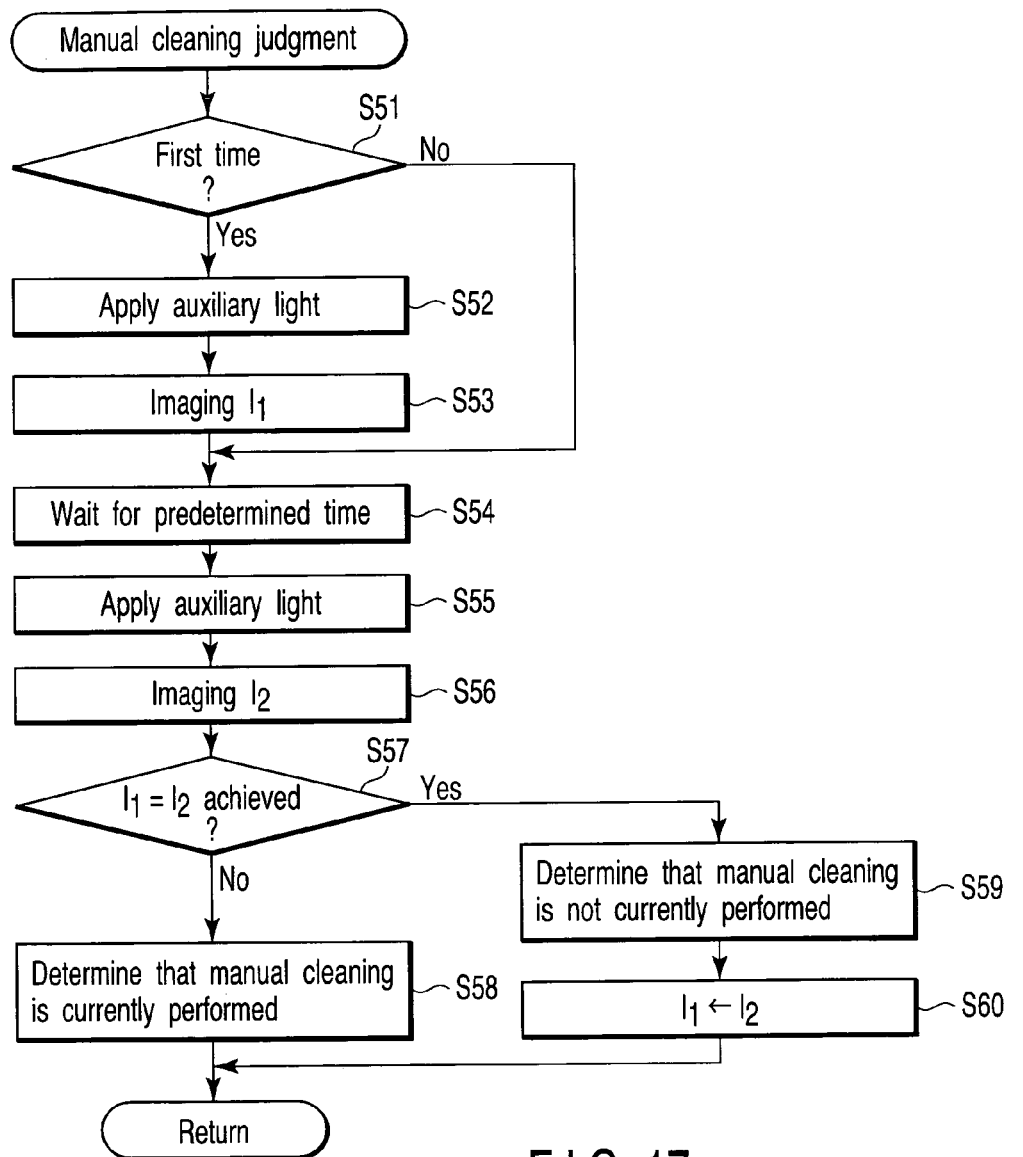
FIG. 17 is a flowchart showing a control over a manual cleaning judgment.
Figure 18:
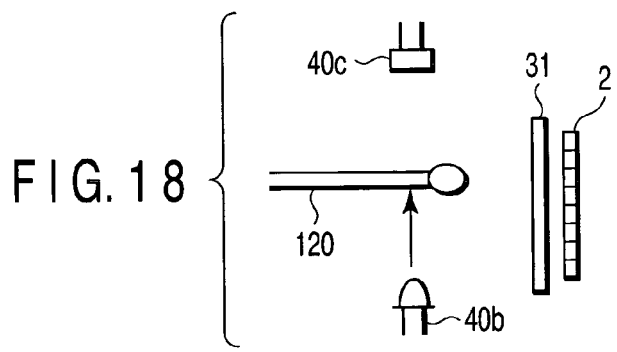
FIG. 18 is a view showing a structure of another example of the manual cleaning judgment.

Such a manual cleaning judgment is carried out in accordance with such a flowchart as shown in FIG. 17. In FIG. 17, the in-body CPU 1 judges whether the current judgment is the first judgment (step S51). In this judgment, if it is determined that it is the first judgment, the auxiliary light is projected from the light projection section 40a (step S52), and an imaging signal acquired by the imaging element 2 in this period is determined as $I_1$ (step S53). Then, after the apparatus is set in a standby mode for a predetermined time (step S54), the auxiliary light is again projected (step S55), and an imaging signal acquired by the imaging element at this time is determined as $I_2$ (step S56).

Subsequently, the in-body CPU 1 judges whether there is a change between the imaging signal $I_1$ and the imaging signal $I_2$ (step S57). If there is a change, step S57 diverges to step S58, it is determined that a foreign particle such as a cotton bud is inserted, i.e., manual cleaning is currently performed (step S58). Again referring to FIG. 8, vibration of the protective glass 31 is inhibited. On the other hand, if it is determined that there is no change between $I_1$ and $I_2$ in the judgment at step S57, step 57 diverges to step S59, it is determined that manual cleaning is not currently performed (step S59), and the processing returns to FIG. 8. Further, since the protective glass 31 vibrates by the piezoelectric actuator 32, the dust 130 or the like is shaken off to the outside of the camera.

Furthermore, since this manual cleaning judgment is repeatedly made in FIG. 8, the imaging signal $I_1$ must be fetched as a reference image in the first judgment, but the image signal $I_2$ fetched in the last place can be determined as $I_1$ in the second and subsequent judgments (step S60) and utilized. As a result, in the second and subsequent manual cleaning judgments, the judgment at step S51 diverges to step S54, and hence the imaging signal $I_1$ does not have to be fetched in the second and subsequent judgments.

As described above, according to the first embodiment, it is possible to provide the camera with high reliability and high image quality which can be used for a long time without damaging the thin protective glass in the camera while using both dust shakeoff using vibration by the piezoelectric actuator and dust removal based on wipeoff using a cotton bud or the like.

That is, as the cleaning inside the camera, there are a case in which dust or the like is shaken off by simply vibrating the protective glass 31 and a case in which the dust or the like is wiped off by wiping the protective glass surface by a user with any material. In the first embodiment, however, the protective glass is not broken even if any of these techniques is used, and a user can safely take an image on a further beautiful image taking surface.

Here, although whether a foreign particle such as a cotton bud is inserted into the camera is judged by utilizing an output from the imaging element in the first embodiment, insertion of a foreign particle may be judged by providing a dedicated light reception sensor (a light reception section) 40c and detecting whether the light from the light projection section 40b is interrupted by the cotton bud 120 or the like by utilizing light reception sensor 40c. In this case, although a space in which the light reception sensor 40c is arranged is required, consumed energy can be reduced rather utilizing an output from the imaging element.

SECOND EMBODIMENT

The second embodiment according to the present invention will now be described. The example of manual cleaning has been described in the first embodiment, but the second embodiment is an application to an example in which a dedicated cleaning apparatus is attached to a camera and cleaning is carried out.

Figure 19:
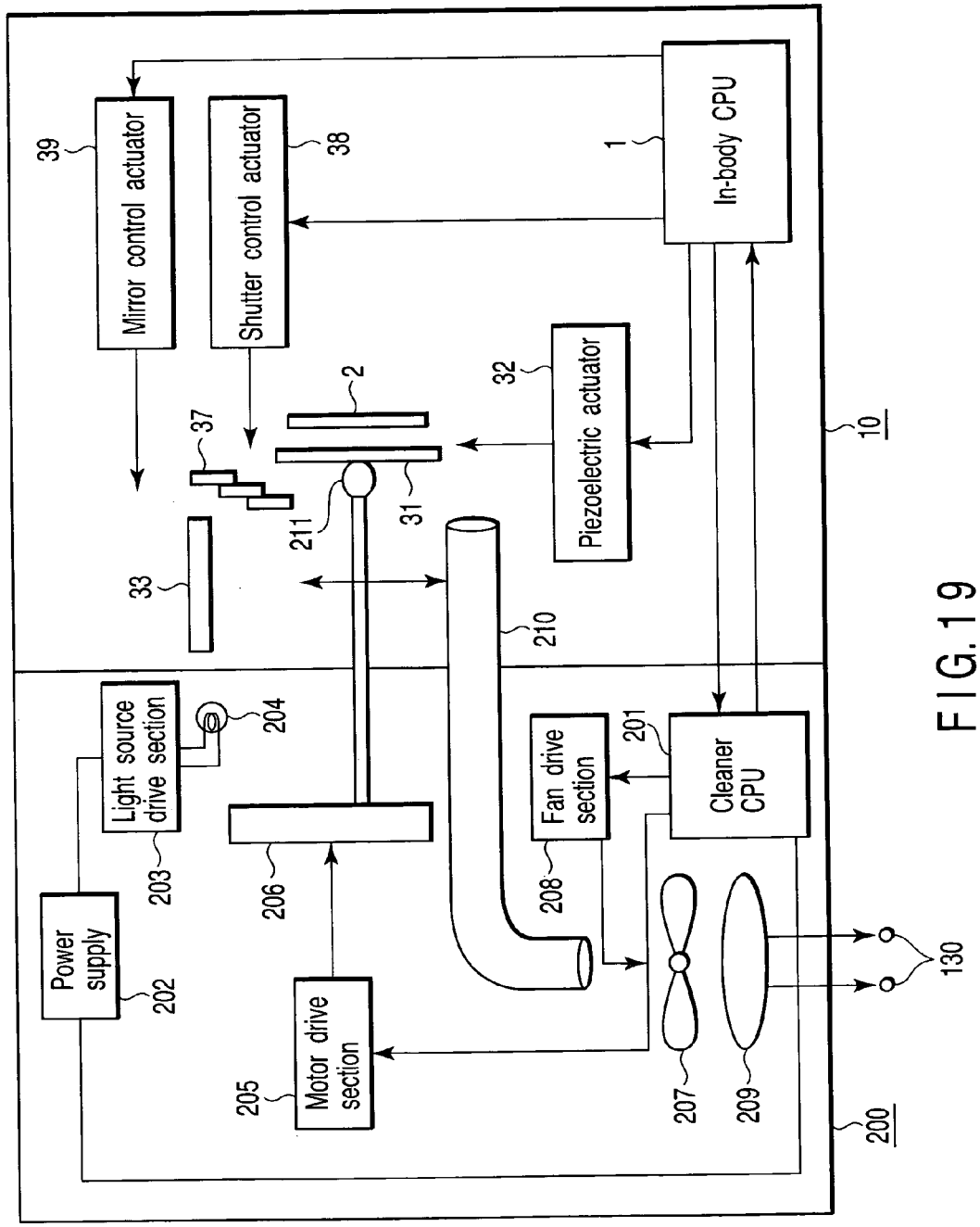
FIG. 19 is a view showing a structure of a second embodiment according to the present invention.

FIG. 19 is a view showing a state in which a cleaning apparatus 200 is attached to a camera main body 10. In the cleaning apparatus 200 are provided a power supply 202 which supplies power to a cleaner CPU 201, an illumination 204, and any other respective drive sections or the like. Upon receiving the power from this power supply 202, communication between a CPU 1 in the camera and the cleaner CPU 201 is started, and a cleaning operation begins.

Figure 20:
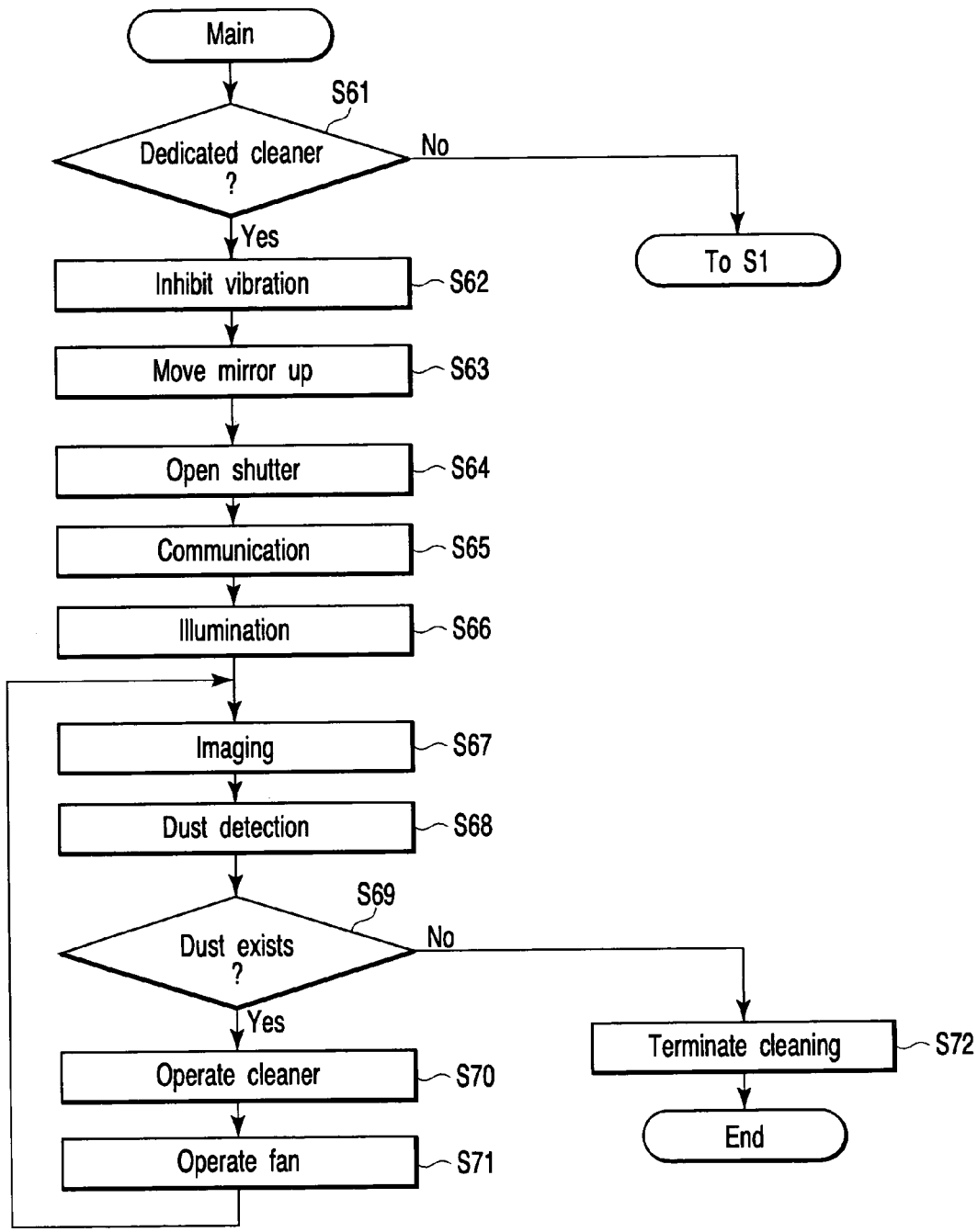
FIG. 20 is a flowchart showing a main control of a camera according to the second embodiment of the present invention.

Processing at this time is shown in a flowchart of FIG. 20. In this flowchart, the two CPUs occasionally transmit/receive information, and an appropriate CPU executes control at each step with each timing. First, the in-body CPU 1 of the camera judges whether the cleaning apparatus 200 is attached (step S61). If the cleaning apparatus 200 is not attached, the processing advances to step S1 in FIG. 7.

On the other hand, if it is determined that the cleaning apparatus is attached, the in-body CPU 1 inhibits vibration of the protective glass 31 (step S62). Thereafter, it moves the main mirror 33 up (step S63), opens the shutter 37 (step S64), and then transmits information which is required to enable the cleaner CPU 201 to perform the following operation control (step S65).

Here, although communication between the in-body CPU 1 and the cleaning CPU 201 is also actually carried out in a judgment upon whether the cleaning apparatus 200 is attached at step S61 or in dust detection which will be described later, but it is typified by the processing at step S65 for clarifying the explanation.

When communication informing that the operation of moving the mirror up or opening the shutter is terminated is carried out based on communication at step S65, the cleaner CPU 201 drives the illumination 204 in the cleaning apparatus through a light source drive section 203 in order to project light in response to this communication (step S66). Thereafter, the cleaner CPU 201 takes an image by using an imaging element in the cleaning apparatus (step S67), and detects dust based on this result (step S68). Further, the cleaner CPU 201 judges whether dust or the like is attached to the protective glass 31 (step S69).

If it is determined that dust is attached in the judgment at step S69, the cleaner CPU 201 drives a linear motor 206 through a motor drive section 205 (step S70). At this time, a cleaning apparatus section (a cleaner section) 211 moves on the protective glass 31, thereby performing the cleaning. Then, the cleaner CPU 201 rotates a fan 207 through a fan drive section 208 (step S71). As a result, dust or the like shaken off by the cleaning operation is sucked from a suction pipe 210 by the rotating fan 207, and discharged to the outside from an exhaust hole 209.

Thereafter, the operations from step S67 to step S71 are repeated until it is determined that dust or the like is not attached to the protective glass 31 in the judgment at step S69. If it is determined that dust or the like is not attached in the judgment at step S69, step S69 diverges to step S72, thereby terminating the cleaning (step S72). Here, the cleaning apparatus section 211 has a retractable structure.

As described above, according to the second embodiment, since vibration of the protective glass is stopped by the appropriate CPU communication even if the dedicated cleaning apparatus is utilized, it is possible to take measures to solve the problem of attachment of foreign particles or the like to the imaging surface without damaging the protective glass.

Third Embodiment

Figure 21:
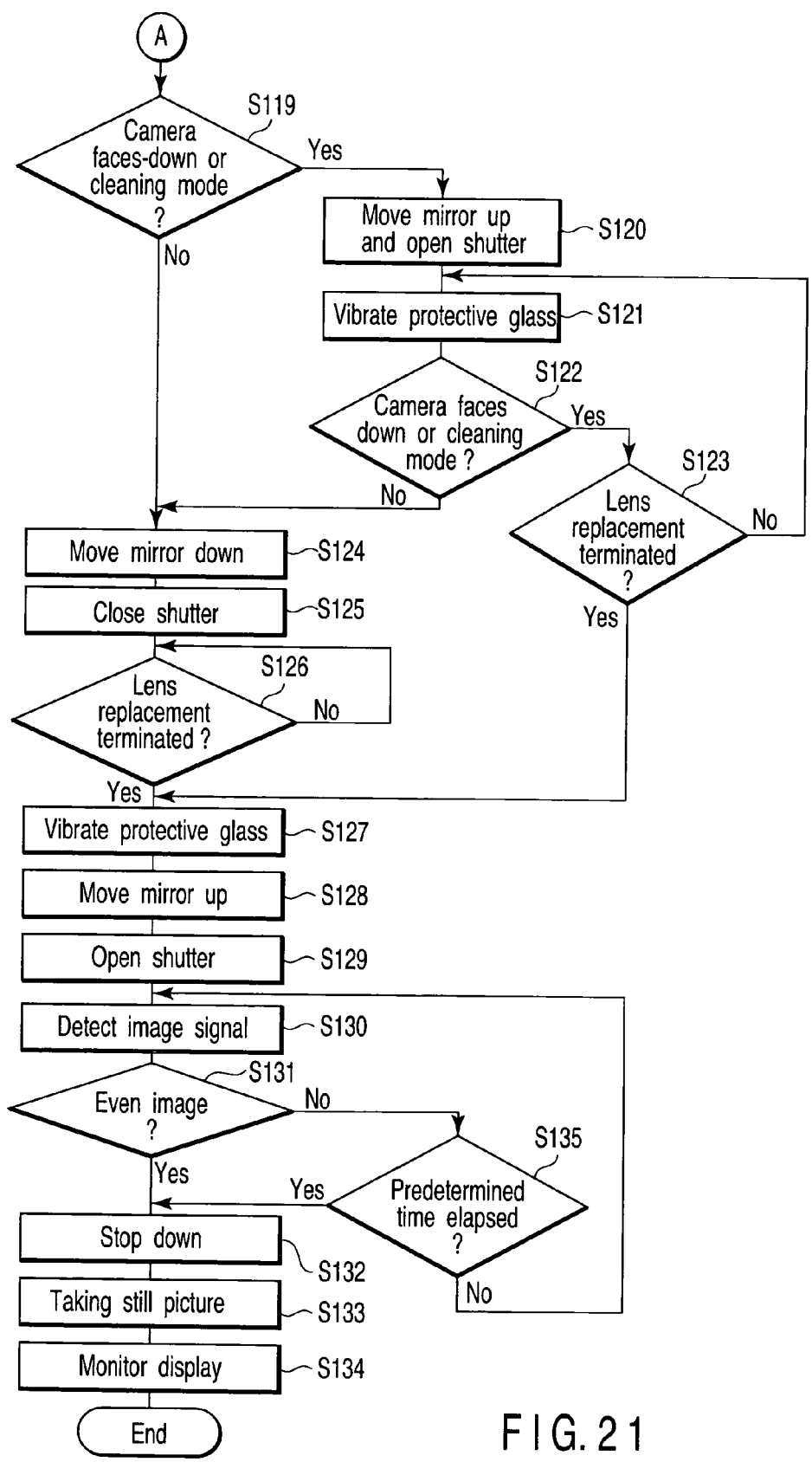
FIG. 21 is a flowchart showing a main control of the camera according to the third embodiment of the present invention.

FIG. 21 is a flowchart explaining the main control performed in the camera, which is the third embodiment of the invention.

The camera according to the third embodiment is similar in structure to the camera according to the first embodiment. The components identical to those of the first embodiment are designated at the same reference numerals and will not be described.

With reference to FIG. 21, it will be described how to avoid dust from entering the camera when the lens is replaced. (That is, the operation that follows step S18 shown in FIG. 7 will be explained.)

That is, the in-body CPU 1 judges whether a lens replacement operation is started (step S18). This judgment is made based on whether the user 110 has operated a switch (lens replacement sW1*b*) which operates in cooperation with a lens fixing lock pin. If it is determined that the lens replacement operation is started, the processing diverges from step S18 to step S119. Then, the in-body CPU 1 judges whether the camera faces down as shown in FIG. 4 or whether a camera mode is a cleaning mode (step S119). That is, since foreign particles or dust are hard to enter when the camera faces down, the processing diverges from step S119 to step S120. Then, the in-body CPU 1 moves the main mirror 33 up and opens the shutter 37 (step S120). Thereafter, it vibrates the protective glass 31 arranged in front of the imaging element 2 by using the piezoelectric actuator 32 (step S121) so that dust are shaken off. It is good enough to intermittently carry out this vibration until the lens replacement is terminated (this judgment can be made based on a communication state between the in-body CPU 1 and the in-lens CPU 26).

Thereafter, the in-body CPU 1 again judges whether the camera faces down or whether the camera mode is the cleaning mode (step S122). If it is determined that the camera faces down as a result of this judgment, the in-body CPU 1 judges whether the lens replacement operation is terminated (step S123). If it is determined that the lens replacement operation is terminated in the judgment at step S123, the processing advances to step S127. If it is determined that the lens replacement operation is terminated in the judgment at step 23, the processing returns to step S121.

Moreover, if it is determined that the camera does not face down and the camera mode is not the cleaning mode in the judgment at step S119 or step S122, the in-body CPU 1 moves the main mirror 33 down (step S124), and closes the shutter 37 (step S125). Then, it judges whether the lens replacement operation is terminated (step S126), and waits until the lens replacement operation is terminated.

The operation performed after the lens has been exchanged is identical to the operation carried out in the first embodiment.

As has been described, the third embodiment can provide a lens replacement type camera which allows virtually no entrance of dust and which is designed to enable the user to confirm that virtually no dust has entered it.

Here, although the description has been given as to the example in which the processing explained in the foregoing embodiments is carried out in the control section (CPU) in the camera main body or the cleaning apparatus, the present invention is not restricted thereto. For example, the above-described processing may be carried out from the outside by using a remote controller or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A lens replacement type imaging apparatus capable of replacing a taking lens, comprising:
   an imaging section which takes an image of a subject through the taking lens;
   a protective section which is provided between the taking lens and the imaging section, and transmits light rays which have entered through the taking lens therethrough; and
   a control section which judges whether, out of first cleaning processing which performs cleaning processing of the protective section electrically and second cleaning processing which performs cleaning processing of the protective section physically, the second cleaning processing is carried out, and which controls to inhibit the first cleaning processing when it has judged that the second cleaning processing is carried out,
   wherein the second cleaning processing is capable of being executed only when the taking lens is removed from a main body of the imaging apparatus.

2. The lens replacement type imaging apparatus according to claim 1, wherein the imaging apparatus further comprises a vibration section which vibrates the protective section to shake off dust attached to the protective section,
   the first cleaning processing includes performing cleaning processing by electrically vibrating the excitation section, and
   the second cleaning processing includes performing cleaning processing by manually wiping off dust on the protective section.

3. The lens replacement type imaging apparatus according to claim 2, wherein the control section judges whether the second cleaning processing is carried out by judging whether a wiper member with which dust on the protective section is manually wiped off is inserted in a main body of the imaging apparatus.

4. The lens replacement type imaging apparatus according to claim 1, wherein the imaging apparatus further comprises a vibration section which vibrates the protective section to shake off dust on the protective section, and
   the first cleaning processing includes performing cleaning processing by vibrating the vibration section.

5. The lens replacement type imaging apparatus according to claim 1, wherein the second cleaning processing includes performing cleaning processing by manually wiping off dust on the protective section.

6. A lens replacement type imaging apparatus capable of replacing a taking lens, comprising:
   a light quantity control section which adjusts a quantity of light which enters through the taking lens, the light quantity control section including an aperture mechanism;
   an imaging section which takes an image of a subject through the taking lens;
   a display section which displays an image based on an output from the imaging section;
   a protective section which is provided between the taking lens and the imaging section, and transmits light rays which have entered through the taking lens therethrough;
   a cleaning process section which performs cleaning processing of the protective section; and a control section which causes the cleaning processing section to perform the cleaning processing, then, sequentially causes the light quantity control section to perform a stopping down operation of the aperture mechanism, the imaging section to perform imaging operation, and the display section to perform display operation.

7. The lens replacement type imaging apparatus according to claim 6, wherein the imaging apparatus further comprises a light shielding member which is arranged between the taking lens and the protective section and is capable of moving into/away from an optical path for taking an image, and the control section controls to move the light shielding member away from the optical path for taking an image and display a state of the protective section in the display section when the taking lens is attached to the imaging apparatus after operating the cleaning processing section.

8. The lens replacement type imaging apparatus according to claim 7, wherein the control section controls to move the light shielding member into the optical path for taking an image when the taking lens is removed.

9. The lens replacement type imaging apparatus according to claim 7, wherein the imaging apparatus further comprises a setting section which sets a plurality of operation modes including a cleaning mode which is used to perform the cleaning processing, and the control section controls to move the light shielding member away from the optical path for taking an image and display a state of the protective section in the display section when the taking lens is attached in a state that the operation mode is set to the cleaning mode by the setting section.

10. The lens replacement type imaging apparatus according to claim 9, wherein the cleaning processing section has a vibration section which vibrates the protective section to shake off dust on the protective section, and the control section controls to move the light shielding member away from the optical path for taking an image and vibrate the vibration section when the taking lens is removed in a state that the operation mode is set to the cleaning mode by the setting section.

11. The lens replacement type imaging apparatus according to claim 10, wherein the imaging apparatus further comprises an attitude detection section which detects an attitude of the imaging apparatus, and the control section controls to move the light shielding member away from the optical path for taking an image and vibrate the protective section by using the excitation section when the attitude detection section detects that the imaging apparatus is faced downward.

12. The lens replacement type imaging apparatus according to claim 6, wherein the cleaning processing section has a vibration section which vibrates the protective section to shake off dust on the protective section, and the control section controls to perform the cleaning processing by vibrating the vibration section when the taking lens is attached.

13. The lens replacement type imaging apparatus according to claim 6, wherein the control section causes the imaging section to repeat its operation after ending the cleaning processing, and when an image with even brightness is output from the imaging section, the control section sequentially causes the light quantity control section to perform a stopping down operation of the aperture mechanism, the imaging section to perform an imaging operation, and the display section to perform a display operation.

14. The lens replacement type imaging apparatus according to claim 6, wherein the display section enlarges and displays at least a part of an image obtained by the imaging operation.

15. The lens replacement type imaging apparatus according to claim 14, wherein the display section detects a fine particle-like section in the image obtained by the imaging operation, and enlarges and displays the section.

16. A lens replacement type imaging apparatus capable of replacing a taking lens, comprising:

an imaging section which takes an image of a subject through the taking lens;

a protective section which is provided between the taking lens and the imaging section, and transmits light rays which have entered through the taking lens therethrough; and a control section which judges whether, out of first cleaning processing which performs cleaning processing of the protective section electrically and second cleaning processing which performs cleaning processing of the protective section physically, the second cleaning processing is carried out, and which controls to inhibit the first cleaning processing when it has judged that the second cleaning processing is carried out, wherein the imaging apparatus further comprises a vibration section which vibrates the protective section to shake off dust attached to the protective section, the first cleaning processing includes performing cleaning processing by electrically vibrating the excitation section, and the second cleaning processing includes performing cleaning processing by manually wiping off dust on the protective section, wherein the control section judges whether the second cleaning processing is carried out by judging whether a wiper member with which dust on the protective section is manually wiped off is inserted in a main body of the imaging apparatus.

* * * * *